Aug. 28, 1956 N. GEERTSEN 2,760,263
METHOD OF PRODUCING WELDING PROJECTIONS ON OPENING KEYS
Filed March 8, 1955

INVENTOR.
NELSON GEERTSEN
BY Charles H. Erne
Leland R. McCann
George W. Reiber
ATTORNEYS

United States Patent Office 2,760,263
Patented Aug. 28, 1956

2,760,263

METHOD OF PRODUCING WELDING PROJECTIONS ON OPENING KEYS

Nelson Geertsen, Oak Park, Ill., assignor to American Can Company, New York, N. Y., a corporation of New Jersey Application March 8, 1955, Serial No. 492,981

4 Claims. (Cl. 29—554)

The present invention relates to a method of producing welding projections on keys for opening tearing strip cans or containers and has particular reference to producing projections having sharp points.

In the manufacture of sheet metal tearing strip cans, a metal opening key usually is provided with each can to remove the tearing strip to open the cans. The key usually is attached by electric welding to an end wall of the can. To facilitate welding the keys in place, pointed welding lugs are provided on the keys to insure electrical contact with the surface of the can ends during welding. For certain products to be packed in cans, the can ends are required to be protected on inner and outer surfaces with a film of enamel, lacquer or other protective coating substance. Where both faces of the can end are thus coated it is extremely difficult to weld a key to either face since the coating substance electrically insulates the base metal of the can end and hence prevents the establishment of an effective electric welding circuit between the can end and the key to be welded in place.

In order to overcome this difficulty several attempts have been made to produce on the keys welding lugs having points sharp enough to cut through the can surface coating substance when the lugs are pressed tightly against the surface so as to make sufficient contact with the base metal of the can part to establish and maintain an electric circuit of sufficient capacity to transmit enough current to weld the key in place. These attempts have met with various degrees of success, some of which have produced fairly sharp points but not sharp enough to penetrate a heavy film of coating substance. It has been found that temper and structural variables in the key material seriously affect the sharpness of the point of the key lugs but what is more critical of results is the manner of producing the lug. The method of the present invention determines the final sharpness of the lug. It has been found that sharp edges and points cannot be produced when the edge or point being formed is confined in any manner between forming devices. Venting of the confined portion of the key through the devices gives no better results.

The instant invention contemplates overcoming these difficulties by a method of forming on keys welding projections having chisel sharp edges produced by forming plane faces and cutting across or intersecting these faces with other plane faces to effect along the unconfined line of intersection a chisel sharp edge ultimately constituting along with other similar subsequently formed edges, the sharp coat penetrating portion or portions of the projections.

An object of the invention therefore is the provision of a method of producing welding projections on metal container tearing strip keys wherein the projections are formed with sharp points to readily penetrate or cut through any coating material on the metal surface to which the key is to be welded to facilitate welding of the key to the metal surface.

Another object is the provision of such a method of producing welding projections on metal keys wherein the sharpness of the point and the height of the projection may be readily controlled.

Another object is the provision of such a method of producing welding projections on keys wherein the material of sections of the key is compressed and cut across in a manner which avoids confining the displaced key material so as to produce sharp edges.

Numerous other objects and advantages of the invention will be apparent as it is better understood from the following description, which, taken in connection with the accompanying drawings, discloses a preferred embodiment thereof.

Referring to the drawings.

Figure 6:
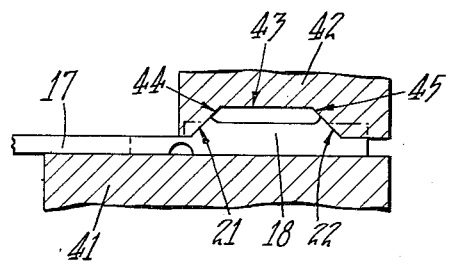
Figure 7:
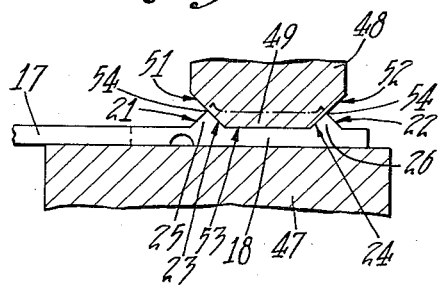
Figure 3:
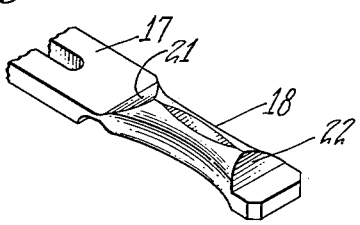
Figs. 3, 4 and 5 are enlarged perspective views of the portion of the key to be welded to a container wall, the views showing the various stages incidental to forming the welding projections.
Figure 8:
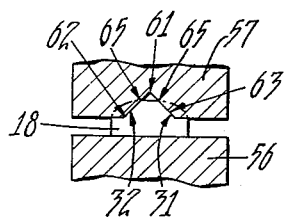
Figure 4:
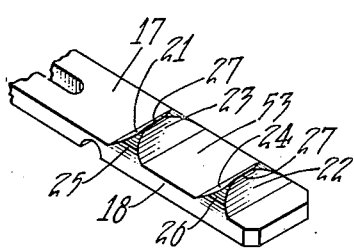
Figure 5:
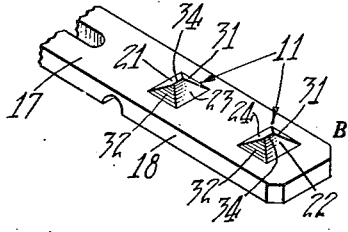

Figs. 6 and 7 are side elevations of the portion of the key illustrated in Figs. 3 and 4, the views showing in section one form of apparatus for carrying out the steps which produce the formations shown in Figs. 3 and 4, parts being broken away; and Fig. 8 is a view similar to Figs. 6 and 7 illustrating an end view of the key and one form of apparatus for carrying out the step which produces the formation shown in Fig. 5, parts being broken away.

Figure 1:
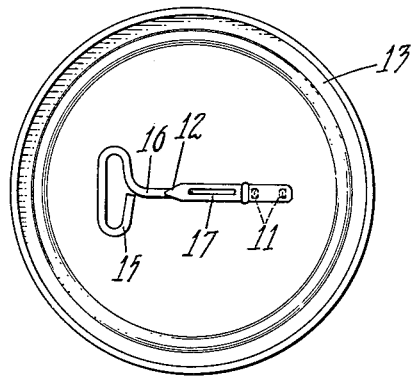
Figure 1 is a top plan view of an end of a container having a key welded thereto through projections formed on the key in accordance with the instant method invention.

As a preferred or exemplary embodiment of the instant invention the drawings illustrate a method of forming sharp pointed welding projections 11 (Fig. 5) on a key 12 (Fig. 1) to facilitate welding of the key to a sheet metal container 13 by cutting through any coating material such as enamel on the metal surface to which the key is to be attached.

Figure 2:
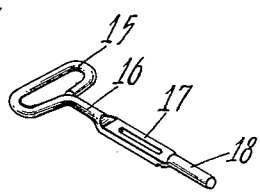
Fig. 2 is a perspective view of a partially completed metal wire key on which the welding projections are to be formed.

The key 12 preferably is of the break-off type and is used after separation from the can wall for the removal of a conventional tearing strip with which the can is provided. The key 12 preferably is made from metal wire and is provided at one end with a loop handle or head 15. The handle 15 merges into a shank 16 having a flattened slotted portion 17 which in turn merges into welding tail extension 18. Before the welding projections 11 are formed on the key, the unfinished tail section 18 (Fig. 2) is of substantially cylindrical shape. It is to the forming or finishing of this tail section 18 to prepare it for subsequent welding to the can that the present invention is directed.

In accordance with the method steps of the invention the cylindrical tail section 18 is first formed with two spaced oppositely disposed outwardly converging tapered plane faces 21, 22 (Fig. 3) called outer faces which extend transversely of the tail section and which are located one near each end of the section. These faces 21, 22 are formed in the side of the key to be attached to the container.

As the next step in the method the outer faces 21, 22 are cut across or intersected at an angle thereto to produce between said outer faces two outwardly diverging tapered plane inner faces 23, 24 (Fig. 4) extending transversely of the tail section and located one adjacent each outer face and forming with said outer faces a pair of transversely extending taper-sided ridges 25, 26 having sharp edged peaks or apices 27. An important feature of this step is the cutting across the one face (outer faces 21, 22) by another face (inner faces 23, 24)

which in effect is an intersection of plane surfaces and which results in a clean sharp edge along the line of intersection. In forming the sharp edge in this manner the peak of the ridge is at no time confined so that there is nothing to shape the edge except the intersection of the faces.

After forming the two sharp-edged ridges 25, 26 they preferably are reduced in length to resemble more the shape of a pyramid to produce the welding projections 11 best shown in Fig. 5. This reduction in length constitutes the next step in the method. The reduction is effected by another cutting across or intersection of the outer and inner faces 21, 22, 23, 24 without in any manner confining the edges of the intersected faces. This intersection is effected in a direction longitudinally of the tail section 18 and produces cooperating pairs of outwardly converging tapered plane end faces 31, 32 on the ends of each ridge 25, 26 thereby converting the ridges substantially into pyramids having a sharp short ridge peak 34 which readily cuts through or pierces any surface coating on the metal can to which the key is to be welded. If desired a sharp point may be produced instead of the short ridge 34 by the same method of intersecting the faces 21, 22, 23, 24 as explained above, the ends of the ridges 25, 26 being cut across separately instead of simultaneously. By providing for the intersection of the faces at a predetermined height relative to the key tail section 18 the height of the projections 11 may be controlled and maintained uniform.

Intersection of the plane faces to produce the sharp edged pyramidal welding projections 11 may be effected by any suitabl devices utilizing rollers, dies or cutting tools. In one form of apparatus, illustrated in Figs. 6, 7 and 8 of the drawings, dies are utilized to form the projections 11. Fig. 6 illustrates the initial step of forming the outer faces 21, 22 in the cylindrical shaped tail section 18 of the key. The die mechanism utilized to produce these faces comprises a lower stationary support member 41 on which the tail section 18 is supported and an upper punch member 42 which is movable toward and away from the support member 41. The lower face of the punch member 42 is formed with a clearance recess 43 extending transversely of the member in relation to the tail section 18. This recess 43 along its transverse edges is defined by a pair of converging, tapered or inclined flat wall sections 44, 45, which when the punch member 42 is forcibly pressed against the key tail section 18, compresses the tail section and forms therein the two outer faces 21, 22 as shown in Fig. 6 without in any manner confining the material of the tail section.

In a similar manner the inner faces 23, 24 are formed in the tail section 18 as shown in Fig. 7 by a die mechanism which includes a lower stationary support member 47 and an upper movable punch 48. The lower face of the punch member 48 is provided with a flat nose 49 defined by a pair of diverging tapered or inclined outer wall sections 51, 52 which extend transversely of the punch in relation to the key tail section 18. When the punch 48 is forcibly pressed against the key tail section 18 as shown in Fig. 7, the flat nose 49 compresses the central portion of the cylindrical shaped tail section 18 and forms in the key tail section 18 a transverse channel 53 defined by outer diverging flat wall sections which constitute the inner faces 23, 24 hereinbefore mentioned. It should be noted in this connection that the punch tapered wall sections 51, 52 are made considerably wider than needed for the purpose of insuring that they cut across or intersect the outer faces 21, 22 as originally formed, the intersection taking place at a predetermined height and along a transverse line 54 without in any manner confining the material of the tail section in the region of this line. Thus by a single stroke of the punch member 48, the tail section 18 of the key is provided with the two spaced apart transverse ridges 25, 26 having the sharp peaks or cutting edges 27 at the intersection line 54.

Reduction of the length of the ridges 25, 26 to form the substantially pyramidal shaped welding projections 11 preferably is effected by a die mechanism which includes a lower stationary support member 56 (Fig. 8) and an upper movable punch 57 between which the tail section 18 of the key is compressed. The lower face of the punch 57 is provided with an inverted V-notch 61 defined by a pair of converging flat tapered or inclined wall sections 62, 63 which extend longitudinally of the punch face in relation to the key tail section 18. When the punch 57 is forcibly pressed against the key tail section 18, the notch 61 in the punch extends across the two ridges 25, 26 and the inclined wall sections 62, 63 of the punch compress the ends of the ridges, cutting across the sharp peak edges 27 of the ridges at intersection lines 65 to form the tapered end faces 31, 32 and the shortened sharp peak edges 34 between them, without in any manner confining the material of the ridges at the intersection lines 65 to preserve the sharpness of the edges. This operation completes the formation of the welding projections 11.

Obviously if sharp pointed pyramidal shaped projections are desired the tapered end faces 31 can be formed separately and the end faces 32 formed subsequently instead of both end faces 31, 32 being formed simultaneously as explained above. By forming the faces separately they may be made to intersect at the peak of the pyramid and thereby produce one sharp point instead of the short ridge 34.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the process hereinbefore described being merely a preferred embodiment thereof.

I claim:

1. A method of forming welding projections on a welding portion of a key for a tearing strip can, comprising the steps of forming on said welding portion a pair of spaced oppositely disposed outwardly converging tapered plane outer faces extending transversely of said portion, forming on said portion a second pair of spaced oppositely disposed outwardly diverging tapered plane inner faces located one adjacent each of said outer faces between said outer faces and extending transversely of said portion, said inner faces intersecting said outer faces intermediate the height of said outer faces to produce a pair of spaced taper-sided transversely extending ridges having a sharp peak edge at the line of intersection of said inner and outer faces, and forming at the opposite ends of said ridges outwardly converging tapered plane end faces intersecting the sharp peak edges of said ridges to reduce the length of said ridges to substantially pyramidal shaped welding projections having sharp peak edges adapted to pierce a coating material on a surface of a can to facilitate welding of a said key to said surface.

2. A method of the character defined in claim 1 wherein all of said plane faces are intersected without confining the material of the welding portion of the key at the lines of intersection to produce sharp edges along the lines of intersection.

3. A method of the character defined in claim 1 wherein the intersection of said plane faces is effected at a predetermined height to produce a plurality of projections of the same height.

4. A method of forming welding projections on a welding portion of a key for a tearing strip can, comprising the steps of compressing the material of said portion to form on said portion a pair of spaced oppositely disposed outwardly converging tapered plane outer faces extending transversely of said portion, compressing the material of said portion between said outer faces while simultaneously cutting across said outer faces to form on said portion a second pair of spaced oppositely disposed outwardly diverging tapered plane inner faces located one adjacent each of said outer faces between said outer faces and extending transversely of said portion, said inner faces intersecting said outer faces intermediate the height of said outer faces to produce a pair of spaced tapered-sided transversely extending ridges having a sharp peak edge at the line of intersection of said inner and outer faces, and compressing the opposite ends of said ridges and simultaneously cutting across the peak of said ridges to form outwardly converging tapered plane end faces intersecting the sharp peak edges of said ridges to reduce the length of said ridges to substantially pyramidal shaped welding projections having sharp peak edges adapted to pierce a coating material on a surface of a can to facilitate welding of a said key to said surface.

No references cited.